Patented May 24, 1932

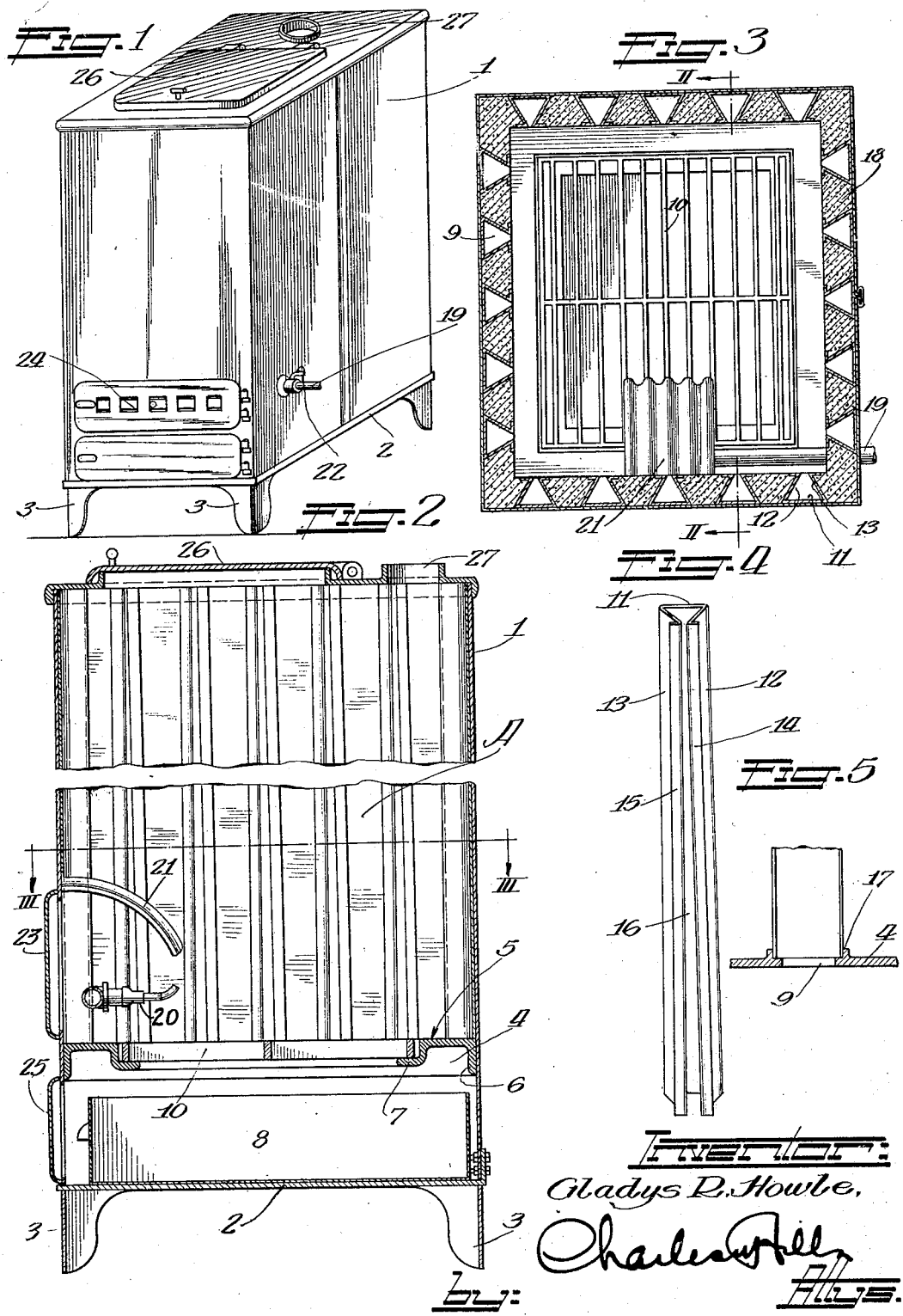

1,859,445

REISSUED

UNITED STATES PATENT OFFICE

GLADYS R. HOWLE, OF CHICAGO, ILLINOIS, ASSIGNOR TO ERNEST O. HOWLE, OF CHICAGO, ILLINOIS

GARBAGE BURNER

Application filed January 17, 1929. Serial No. 333,060.

This invention relates to a garbage burner and particularly to a small, compact, efficient garbage burner for household use.

An object of the invention is to provide a compact, efficient garbage burner for household use which will readily burn garbage and trash in an efficient and expeditious manner.

Another object of the invention is to provide a garbage burner having air ducts in the side walls of the combustion chamber which ducts are open from top to bottom to the combustion chamber.

A further object of the invention is to provide a garbage burner having air ducts in the side walls of the combustion chamber which ducts serve as air flues and also as structural elements of the garbage burner.

A still further object of the invention is to provide a garbage burner having spaced air ducts open from top to bottom with the intervening spaces between the ducts filled with plastic material such as fire clay for providing a lining for the garbage burner, the ducts serving to retain the lining in the walls so formed.

A yet further object of the invention is to provide a garbage burner having a gas jet directed against the material within the combustion chamber and a shelf serving to prevent the mass within the garbage burner from clogging the jet.

Another and further object of the invention is to provide a garbage burner with air ducts communicating with the ash pit and passing upwardly therefrom which ducts are open from top to bottom in communication with the combustion chamber the ducts diverging from top to bottom to allow ready removal of any foreign matter in the same.

Another and still further object of the invention is to provide a garbage burner having air ducts in the walls of the combustion chamber and in which a flange is provided defining the grate opening which flange is apertured at intervals with the ducts communicating with the apertures of the flange together with plastic lining material inserted between the ducts there being anchoring means for maintaining the lining between the ducts.

The above, other and further objects of the invention will be apparent from the following description, accompanying drawings and appended claims.

One form of the invention is illustrated in the accompanying drawings and the views thereof are as follows:

Figure 1 is a perspective view of a garbage burner embodying this invention.

Figure 2 is an enlarged fragmental vertical section through a garbage burner embodying the invention taken on the line II—II of Figure 3.

Figure 3 is a horizontal section taken on line III—III of Figure 2.

Figure 4 is a perspective view of one of the air ducts.

Figure 5 is a fragmental partial sectional view showing one means for associating the air ducts with the grate supporting flange member.

One of the successful requirements for operation of a garbage burner of the type of this invention is that air be circulated about the mass of garbage and trash in the garbage burner for the purpose of drying the garbage. It is well recognized that air will not pass through a pile of wet garbage, hence air must be circulated about the garbage in a garbage burner for drying purposes.

The garbage burner embodying this invention contemplates the provision of vertically disposed air ducts in the wall of the combustion chamber which ducts are open to the chamber from top to bottom with the circulation of air entering said ducts from below the grate passing upwardly about the mass of garbage in the chamber.

Figure 1 discloses a garbage burner embodying this invention which garbage burner in its completed form is small and compact, occupying relatively little floor space. It is possible to construct a garbage burner embodying this invention and which will effectively burn garbage in a size as small as 18 x 20 inches in floor plan and 40 inches in height.

The garbage burner shown in Figure 1 includes a casing 1 secured in any suitable manner to a bottom 2 which bottom is supported by feet or legs 3 on the floor. The bottom 2 and the legs 3 may be an integral casting or may be of structural elements assembled as desired.

A grate supporting member made in the shape of a ring 4 has a flat surface 5, an outer depending flange 6 which is secured in the structure of the garbage burner in any suitable manner as a central shelf 7 which shelf forms a support for a grate. The opening defined by the shelf 7 is large enough so that the ashes of the matter burned in the combustion chamber A will fall downwardly into an ash box 8 supported on the bottom 2 of the garbage burner. The ring 4 is shaped to conform to the contour of the garbage burner which in the drawings is shown as rectangular although it may of course be of any other desired shape and size.

The ring 4 is provided at intervals in its length with a plurality of apertures 9 spaced in the ring. The apertures 9 in the present drawings are shown as triangular in plan.

A grate 10 shaped to conform to the space defined by the shelf 7 of the ring 4 and in the illustrated drawings shown as an integral casting is removably supported on the shelf 7. The spaces between the grate bars are such as to allow tin cans and the like to pass through the grate into the ash drawer 8 for removal.

Figure 4 shows a perspective view of one of the air ducts employed in this invention. The duct may be made of cast metal or of sheet metal formed to proper shape and size.

The duct illustrated herein comprises a rear face 11, two side faces 12 and 13 which converge with the marginal edges 14 and 15 bent outwardly away from each other to provide flanges with the space between the flanges serving as an air opening when the ducts are applied in position. The gap 16 formed between the flanges 14 and 15 preferably converges from the bottom of the duct to the top. The duct is also made so that the same tapers upwardly from the bottom.

One of the ducts is disposed over one of the openings 9 in the ring 4 and may be secured in position in any desirable manner. One form of securing the duct to the ring 4 is illustrated in Figure 5 and includes a rib 17 formed on the ring 4 conforming to the contour of the aperture 9 and spaced away from the margins thereof so as to receive the lower end of one of the ducts and support the same on the ring in communication with the aperture 9. It is of course within the contemplation of this invention that a ridge or rib might be formed on the duct member and supported on the ring 4 with the lower end of the duct entering the aperture 9. Other means of securing these parts together may be employed as desired.

The combustion chamber A is formed by applying a plurality of the ducts to the apertures 9 in the ring 4 in the manner described against the outer sheeting of the garbage burner and then filling the spaces between the several ducts with plastic material such as fire clay and the like thereby forming a liner 18. Plastic material is disposed so as to be flush with the flanges 14 and 15 of the ducts which flanges overlie the material 18 to lock the same in the wall formed by the air ducts and the plastic material. In this manner the combustion chamber A is provided with a smooth wall the greater portion of which is of fire clay or similar material and a smaller portion is of the metal flanges of the several ducts.

A gas pipe 19 passes into the garbage burner through one of the walls of the same and has a jet 20 disposed near one of the walls of the combustion chamber and has its end preferably bent upwardly. A shelf 21 curved in end elevation is secured to the wall of the garbage burner adjacent the burner 20 and is arranged to overlie the burner 20 in such relation as to prevent any of the garbage or trash in the combustion chamber from reaching and thereby clogging the burner 20. The width of the self 21 is such as to amply protect the burner 20 in this regard. The shelf 21 may if desired be perforated to aid the air circulation within the combustion chamber A.

A valve 22 is inserted in the gas pipe line outwardly of the garbage burner for turning on and off the gas.

A door 23 is arranged in the garbage burner adjacent the burner 20 for the purpose of access to the burner for lighting the same. Said door has a slide 24 therein for regulation of the admission of air to the combustion chamber A. An ash door 25 is arranged at the lower part of the garbage burner whereby the ash tray or drawer 8 may be withdrawn and returned to position.

A door 26 is provided in the top of the garbage burner whereby garbage and trash may be emptied into the combustion chamber A. A pipe connection 27 is provided near the rear of the garbage burner.

The operation of the garbage burner is as follows:

The combustion chamber A is filled with garbage and trash and the gas jet 20 is lighted. It is a well recognized fact that wet garbage will not allow the passage of air therethrough. Hence the air admitted to the interior of the garbage burner passes through the door 23 downwardly through the ring 4 into the ash pit and then upwardly through the several ducts disposed in the wall of the combustion chamber. The air escapes from these ducts and overlies the mass of garbage wherever the garbage is out of contact with the ducts. Air in its passage as just described necessarily absorbs some heat from the gas burner hence aids in drying the exterior of the mass of garbage in the chamber A. The gas jet 20 is allowed to burn for a relatively short period of time until sufficient of the garbage is dried so that the same ignites burning the garbage and also drying the balance of the mass within the combustion chamber. This continues until all of the garbage and trash has been reduced to ashes which ashes fall through into the ash drawer 8 for removal. The tapering of the air ducts as well as the tapering of the apertures 16 in the same is for the purpose of dislodging any foreign matter which perchance may enter the ducts as a poker or like instrument may be very readily run down the ducts from the top dislodging the foreign matter whereby the same readily falls outwardy of the ducts into the ash pit.

It will be observed that air circulation is all about the mass of garbage within the combustion chamber. Such circulation therefore hastens the drying of the garbage and a consequent burning of the same. It will furthermore be noted that the circulation of air is through the walls of the combustion chamber and not through the mass of garbage as it has been found that air circulation through the mass of garbage is not possible. It has been found that a garbage burner constructed in accordance with this invention burns the garbage very readily and without odor and with a relatively small amount of gas consumption.

The invention is directed primarily to a small garbage burner for household use but of course may be used with a garbage burner of any size and shape attention being paid to the proper arrangement and proportions of parts.

It will be observed that the grate 10 is very readily removable from its shelf 7 for the purposes of replacement and cleaning and repair. In fact, the whole garbage burner is one which is very simple to construct and one which is very efficient in operation under all conditions and with all kinds of garbage and trash. The protection of the gas burner is ample to prevent clogging of the same under all conditions of service and with all classes of garbage thereby resulting in an efficient, practical and usable garbage burner.

Should it be desired to line the combustion chamber A with bricks or the like, instead of plastic material, as herein described, then the bricks would be so shaped as to provide the vertical air ducts and the metallic ducts could, if desired, be omitted.

It will be obvious that the curved shelf 21 will tend to direct garbage and trash lodged thereon towards the center of the chamber, and that a space for air is defined by the shelf, the wall of the chamber, the grate, and garbage lying on the grate. It will be equally obvious that the air heated by the gas jet in the space so defined will be deflected by the curved under surface of the shelf towards the down-draft outlet 9.

The invention has been described herein more or less precisely, yet it is to be understood that changes may be made in the arrangement and proportions of parts, and that equivalents may be substituted without departing from the spirit and scope of the invention.

The invention is claimed as follows:

1. A garbage burner including in combination, an outer casing, a combustion chamber, a grate supporting frame in the lower end of said chamber, a grate supported by said frame, said frame being provided with spaced apertures adjacent said casing, a plurality of spaced vertically disposed hollow members in communication with the apertures in said frame, said members being open to the combustion chamber from top to bottom, a gas burner within said chamber and at one side thereof, air admission ports in said casing communicating with said gas burner, a deflector curved inwardly and downwardly and spaced in overlying relation to said gas burner to protect said gas burner and to direct incoming air downwardly past said burner.

2. A garbage burner including in combination, an outer casing, a chamber, a grate dividing the chamber into a combustion chamber and an ash pit, a plurality of spaced vertically disposed hollow members in the combustion chamber, said members being open to the combustion space from top to bottom and opening into the ash pit at their lower ends, a gas burner in the combustion chamber at a substantial distance above said grate and overlying a portion of said grate, a deflector curved inwardly and downwardly and spaced in overlying relation to said gas burner to protect said burner, said deflector extending over a substantial portion of said grate, and air inlet means in a side of said casing opening into the combustion chamber.

In testimony whereof I have hereunto subscribed my name at Chicago, Cook County, Illinois.

GLADYS R. HOWLE.